May 28, 1963 R. H. RILEY, JR 3,091,433
VACUUM-ACTUATED APPARATUS AND METHOD FOR DRAWING
LINES THROUGH A PIPE OR CONDUIT
Filed Oct. 2, 1961 3 Sheets-Sheet 1
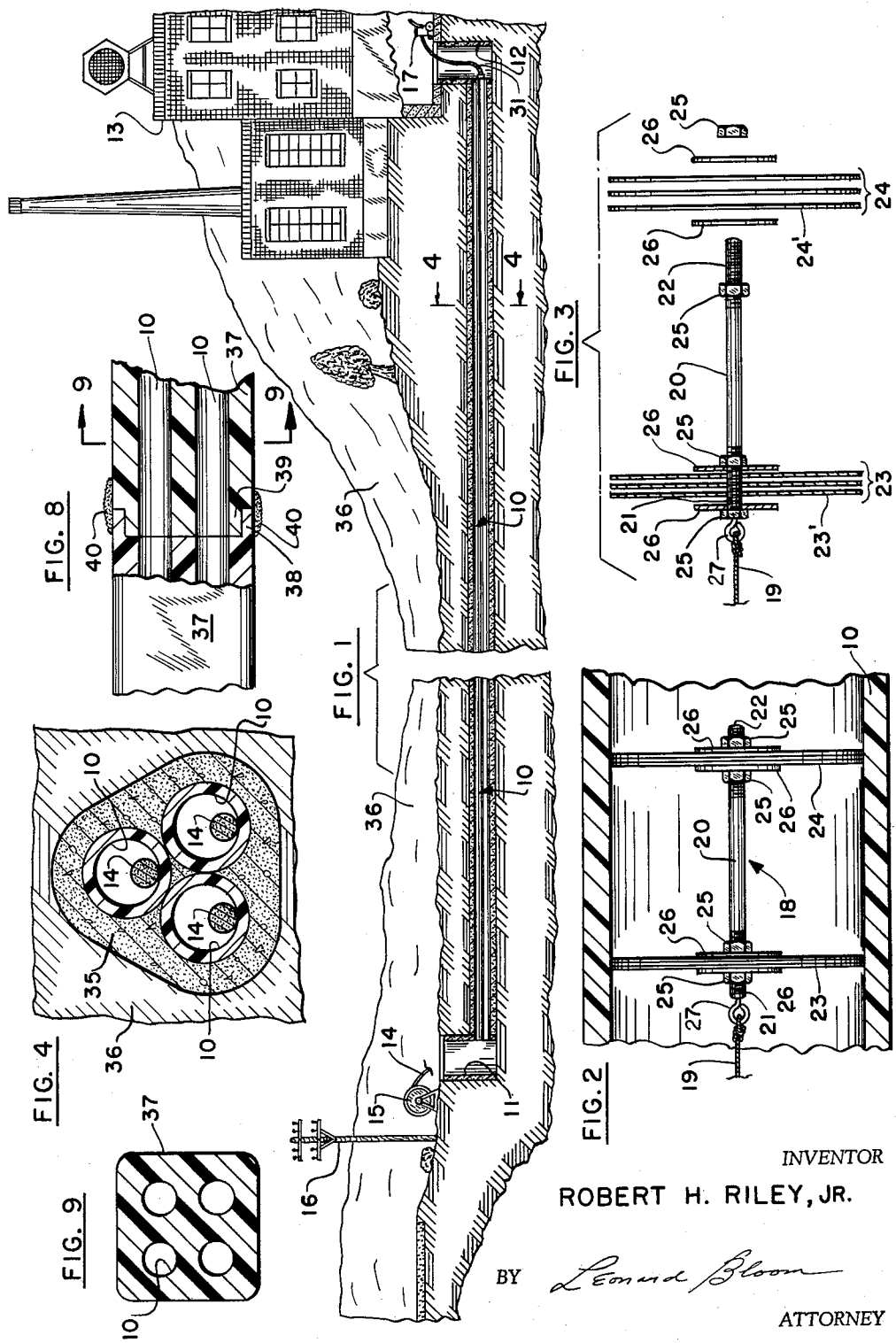
INVENTOR
ROBERT H. RILEY, JR.
BY *Leonard Bloom*
ATTORNEY

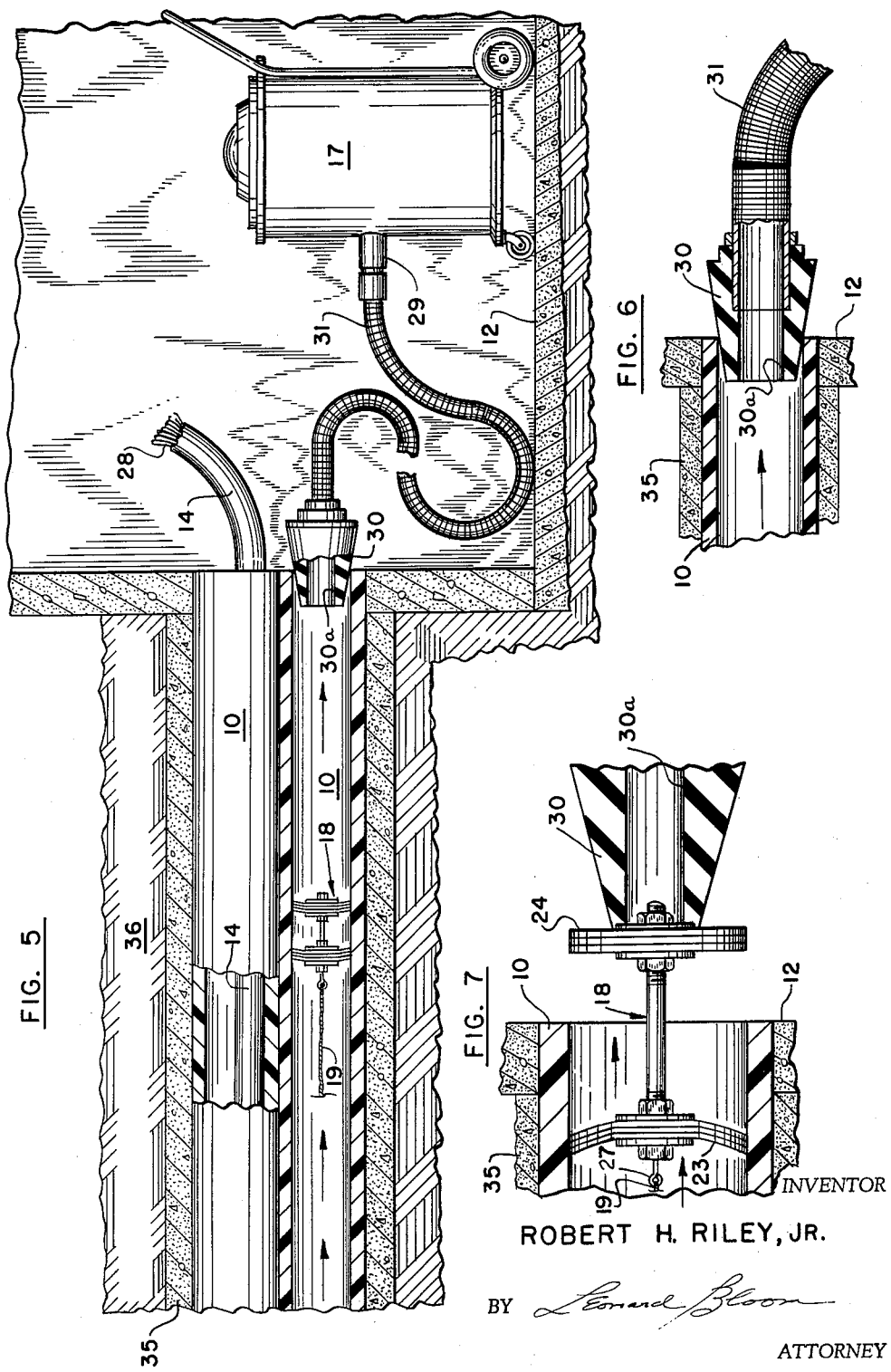

May 28, 1963  R. H. RILEY, JR  3,091,433
VACUUM-ACTUATED APPARATUS AND METHOD FOR DRAWING
LINES THROUGH A PIPE OR CONDUIT
Filed Oct. 2, 1961  3 Sheets-Sheet 3

INVENTOR
ROBERT H. RILEY, JR.

BY

ATTORNEY

United States Patent Office 3,091,433
Patented May 28, 1963

3,091,433
VACUUM-ACTUATED APPARATUS AND METHOD FOR DRAWING LINES THROUGH A PIPE OR CONDUIT
Robert H. Riley, Jr., Towson, Md., assignor to The Black and Decker Manufacturing Company, Towson, Md., a corporation of Maryland
Filed Oct. 2, 1961, Ser. No. 142,324
8 Claims. (Cl. 254—134.4)

The present invention relates to an apparatus and method for threading a line through a conduit utilizing means which include a portable source of suction or else a portable blower having a continuous output flow of air, and more particularly, to such an apparatus and method that utilizes a portable electric vacuum cleaner of the wet pick-up type.

In the present commercial practice of threading a line through a conduit, so as to be able to ultimately draw an electrical cable through the conduit by means of the threaded line, the methods generally devolve into two main categories: one, a manual threading or "fishing" of the line through the conduit utilizing a metal tape, which is a tedious, inept and inefficient method, especially where bends or joints are involved; and two, a pressurized method which involves blowing the line through the conduit from the discharge of a highly-pressurized tank of a suitable gas, such as compressed air or carbon dioxide or the like, whereby a small carrier or cartridge is blown through the conduit.

This latter method, namely the pressurized method, while admittedly offering some advantages over a manual threading, is only partially satisfactory inasmuch as it suffers from the following deficiencies: one, it is used in conjunction with a highly-pressurized source, such as a tank, which will discharge only a limited quantity of gas, and hence this method is impractical and inefficient for threading relatively-large diameter conduits of appreciable length; two, because of the limited capacity, the pressurized method is easily deterred or interrupted by kinks or discontinuities in the conduit, which are usually prevalent, or by foreign matter inadvertently disposed in the conduit; three, and again because of the limited capacity of the pressurized method, a relatively-fine line of low weight (and consequently low tensile strength) is initially employed, and thus several "repulls" are necesary to draw the relatively-heavy cable through the conduit, a "repull" being defined as each drawing of a successively heavier and stronger line through the conduit, until the conduit is threaded with a line or rope having sufficient tensile strength to draw or pull the cable through the conduit; four, the capacity of the pressurized method is quickly dissipated as the given diameter of the conduit increases, and hence, this method is generally unsatisfactory for use in threading conduits having a diameter of 3 inches or greater, which is a popular conduit size in current widespread use, especially involving conduit lengths in the order of several hundred feet; five, it is difficult to control the blow-out of foreign matter through the opposite end of the conduit in advance of the carrier, and thus the room or enclosure at the opposite end of the conduit may be inadvertently damaged, while an undue safety hazard is presented to workmen in the general area; six, due to the use of relatively-high pressures, a restriction in the conduit may cause damage to the adjacent walls of the conduit; seven, the presence of water or moisture, especially in underground conduits, will deter the satisfactory passage of the cartridge or carrier through the conduit; eight, the user may find himself in a very remote locality at the very instant when his tank or supply of pressurized air or carbon dioxide is exhausted; nine, the cartridges are not re-usable, and this, together with the cost of replenishing the highly-pressurized tanks, makes the pressurized method relatively expensive; and ten, and in general, the pressurized method is undesirable in that it is costly, somewhat unreliable, still too time-consuming due to repulls, has limited capacity, and is not completely satisfactory for threading a line through a conduit of any appreciable diameter, length, or difficulty.

Two other prior art methods which are presently utilized, but to a limited extent, are as follows: (1) a series of transportable compressors or "rodding machines," which are usually mounted on a truck, and which are adapted to force a mechanical tape through the conduit; these are large and expensive pieces of equipment, somewhat unwieldly to set up and to operate, and the cost involved generally precludes their use by contractors and instead confines their use to a few of the larger utilities; and (2) a so-called "Electric Mouse," which comprises an electric motor having an electric cord secured thereto and further having a series of external "feelers" or prongs which are vibrated, thus allowing the device to crawl its way through a conduit; this system is costly, it creates a safety problem inasmuch as line voltages are required, it has the undesirable possibility of "losing" the device somewhere in the conduit should the cord be severed, it is not universal for various conduit sizes, and moreover, the smaller conduits, as for example conduits of approximately 3" or less in diameter, cannot be satisfactorily accommodated in view of the motor requirements, and more particularly, in view of the minimum diameters necessary to sustain a sufficiently powerful motor.

Accordingly, it is an object of the persent invention to alleviate all of the aforementioned deficiencies by providing an apparatus and method for threading a line through a conduit by means which utilizes a portable source of suction, such as a portable electric vacuum cleaner, at the end of the conduit opposite from the carrier.

It is another object of the present invention to utilize an industrial portable electric vacuum cleaner, preferably of the wet pick-up type, whereby the conduit may be cleaned of moisture and foreign material prior to or in conjunction with drawing the carrier through the conduit, and whereby the foreign material may be safely collected in the tank of the cleaner and not blown haphazardly throughout the room or enclosure.

It is yet another object of the present invention to utilize a portable electric vacuum cleaner as a blower having an unlimited capacity for the continuous or sustained flow of air in contradistinction to a blower of limited capacity.

It is yet still another object of the present invention to utilize a portable source of suction at one end of the conduit, in combination with a portable blower having a continuous flow of air at the other end of the conduit.

It is a further object of the present invention to provide a portable and versatile system utilizing one or more portable sources of suction connected in parallel with each other at one end of the conduit.

It is a still further object of the present invention to provide a fast and reliable apparatus and method for threading a conduit, wherein the method has sufficient and sustained capacity for threading conduits having diameters of several inches and lengths of several hundred feet or more, and wherein the elapsed time of travel of the carrier through the conduit is measurable in minutes or fractions thereof.

It is a yet still further object of the present invention to provide an apparatus and method for threading a conduit, wherein the number of "repulls" is held to a minimum or else eliminated altogether.

It is again another object of the present invention to provide an apparatus and method for threading a conduit, wherein standard readily-available portable sources of suction and accessories therefor are utilized, and wherein the particular carriers may be easily fabricated directly in the field from a small kit of parts.

It is again yet another object of the present invention to provide an apparatus and method for threading a conduit, wherein the cost of the apparatus and the operation thereof is relatively inexpensive compared to existing commercially-available apparatus.

It is again yet still another object of the present invention to provide a low-pressure suction-actuated apparatus and method for drawing a line through a conduit, wherein the efficiency increases with increases in the diameter of the conduit, in contradistinction to a high-pressure blower system of limited capacity, wherein the capacity is rapidly depleted with increases in conduit diameter.

In accordance with a preferred embodiment of the present invention, there is provided for use with a conduit having a pair of open ends, an apparatus (and method) for threading a line through the conduit, wherein a portable source of suction, such as a conventional portable electric vacuum cleaner, is utilized at one end of the conduit. The portable source of suction is provided with suitable nozzle means in relative air-sealing engagement between the conduit and the cleaner. A carrier is inserted at the other end of the conduit (opposite from the suction source), and a line is secured to the carrier. Consequently, the portable source of suction may be actuated to draw the carrier and the line through the conduit, thereby threading the conduit for subsequent use in drawing an electrical cable through the conduit.

These and other objects of the present invention will become apparent from a reading of the following specification, taken in conjunction with the enclosed drawings, in which:

FIGURE 1 is a pictorial view of an underground conduit through which a telephone cable is to be installed, showing the use of a portable electric vacuum cleaner in threading a line through the conduit for subsequent use in drawing the cable through the conduit;

FIGURE 2 is an enlarged sectional view of a portion of the conduit, showing a suitable carrier inserted in the conduit prior to the actuation of the suction means;

FIGURE 3 is an exploded view of the carrier illustrated in FIGURE 2;

FIGURE 4 is a view taken along the lines 4—4 of FIGURE 1, showing a plurality of underground conduits encased in concrete, wherein a cable is ultimately installed in each conduit;

FIGURE 5 shows the suction means being utilized to draw the carrier through one of the conduits, the other conduit already having the telephone cable installed therein;

FIGURE 6 is an enlarged longitudinal sectional view of the nozzle and connecting hose illustrated in FIGURE 5;

FIGURE 7 shows the final position in the drawing of the carrier through the conduit, whereby the carrier is held fast to the nozzle, and whereby the carrier may be taken out of the conduit;

FIGURE 8 is an enlarged longitudinal view of a modified form of conduit, showing how the plurality of conduits may be formed internally by connecting successive longitudinal sections;

FIGURE 9 is a sectional view taken along the lines 9—9 of FIGURE 8, showing the plurality of conduits formed internally of the interconnecting sections;

Figure 10A:
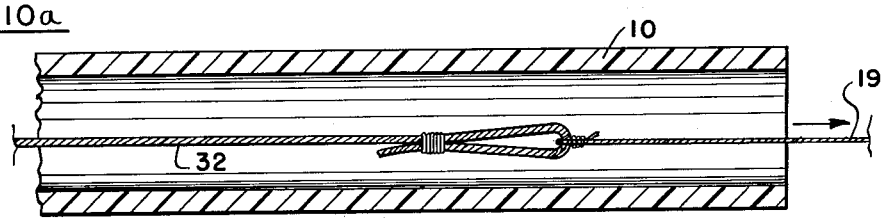
FIGURE 10a shows the initial threaded line secured to a heavier line or rope for drawing the rope through the conduit.

With reference to FIGURE 1, there is illustrated an underground conduit or plurality of conduits, designated generally as at 10; and it will be understood by those skilled in the art, that the teachings of the present invention are equally applicable to a wide variety of conduits and conduit sizes, underground or otherwise, that the term "conduit" encompasses ducts or pipes, and that the particular illustration of FIGURE 1 is only exemplary of one type of environment with which the present invention may be readily utilized.

With reference, again, to FIGURE 1, the underground conduit 10 begins at a suitable manhole 11 and terminates in another manhole 12, which leads to a large building 13. The telephone cable 14, which is to be installed in the conduit 10, may be carried upon a suitable drum 15 and ultimately connected, via the conventional telephone pole 16, to a central installation (not shown). Moreover, it will be appreciated that the underground conduit 10 shown in FIGURE 1 has been deliberately enlarged, in relation to the remaining objects, for purposes of illustration. Finally, a conventional portable electric vacuum 17, preferably of the industrial wet pick-up type, is utilized to thread a line through the conduit 10 in a manner now to be described in detail.

With reference to FIGURES 2, 3, and 5, a suitable carrier 18 is inserted in the end of the conduit 10 opposite from the vacuum cleaner 17, and a line 19 is secured to the carrier 18. The cleaner 17 is actuated, electric power being invariably available; and suction effect of the cleaner 17 is then utilized to draw the carrier 18 through the conduit 10, the pressure being in the order of 5 p.s.i. The carrier 18 comprises a mandrel or arbor 20 having a pair of threaded ends 21 and 22, and a pair of pistons 23 and 24 secured to the arbor 20 by means of a plurality of lock nuts 25 and washers 26. Each of the pistons 23 and 24 is laminated, being comprised of a plurality of individual laminations, 23′ and 24′ respectively, preferably formed from a suitable sheet plastic material. A suitable eyelet 27 is formed integrally at one end of the arbor 20 so as to facilitate the connection of the line 19. Each of the pistons 23 and 24 has a diameter which is slightly larger than the given internal diameter of the conduit 10 to be threaded, such that the pistons 23 and 24 will flex slightly in being drawn through the conduit 10, as shown in FIGURE 5. Moreover, as further shown in FIGURE 5, an adjacent conduit 10 already has the telephone cable 14 installed therein, the cable 14 including at least several hundred pairs of individual wires, designated generally as at 28.

With reference to FIGURES 5, 6, and 7, the conventional portable electric vacuum cleaner 17 is provided with an inlet 29, a suitable frustro-conical nozzle 30, and a flexible coupling hose 31 between the inlet 29 and the nozzle 30. The nozzle 30 has an internal passageway 30a which communicates the conduit 10 with the hose 31. Preferably, the cleaner 17 is of the wet pick-up type, that is, capable of drawing water as well as air into the cleaner; and hence, the individual conduits 10 may be cleaned of moisture as well as foreign matter in advance of threading the line 19 through the conduit 10.

Figure 10B:
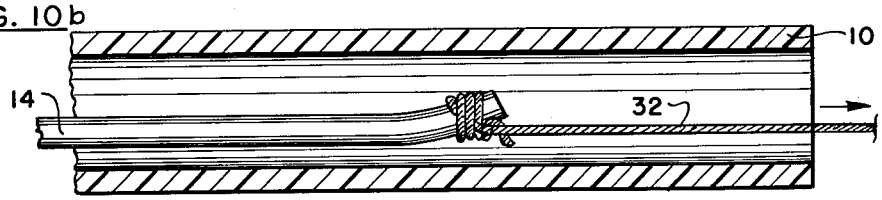
FIGURE 10b shows the rope of FIGURE 10a secured to a cable and being used to draw the cable through the conduit.

With reference to FIGURES 10a and 10b, once the line 19 (secured to the carrier 18) has been threaded or "rodded" through the conduit 10 by means of the suction effect of the vacuum cleaner 17 exerted upon the carrier 18, the opposite end of the line 19 may be secured to a heavier line or rope 32 (as by a simple knotting); and the line 19 may be used to pull the rope 32 through the conduit 10. Then, once the rope 32 has thus been threaded in the conduit 10, the opposite end of the rope 32 may be secured to the cable 14 (as by a simple knotting or taping), and the rope 32 may then be used to pull the cable 14 through the conduit 10. Usually, two operators or workmen are utilized, one at each end of the conduit 10, and the conduit 10 may be used as a communication carrier of their voices so that the actions of the operators are synchronized with one another. The sequence shown in FIGURES 10a and 10b illustrates just one "repull," although it will be understood that under certain circumstances, the "repulls" may be eliminated altogether. Such would be the case when the initial threaded line 19 would be secured directly to the cable 14 and utilized to draw the cable 14 through the conduit 10. The method of the present invention facilitates the drawing of a fairly strong line 19 initially through the conduit 10, by virtue of the powerful and sustained pull realized from the cleaner 10; and hence, the number of "repulls" is held to a minimum, if not altogether eliminated.

In one example of the present invention, less than one minute was required to draw a carrier through an underground conduit of approximately 300 feet in length, the apparatus utilizing only one vacuum cleaner 17 as the suction means.

A subsidiary advantage of the present invention, over and above those hereinbefore enumerated, resides in the use of the suction-actuated system, whereby the particular conduit to be threaded may be located out of a plurality of adjacent conduits by the operator applying the suction to one end of the conduit, while the operator at the other end of the conduit merely passes his hand over the conduits to find the conduit to be threaded.

Figure 11:
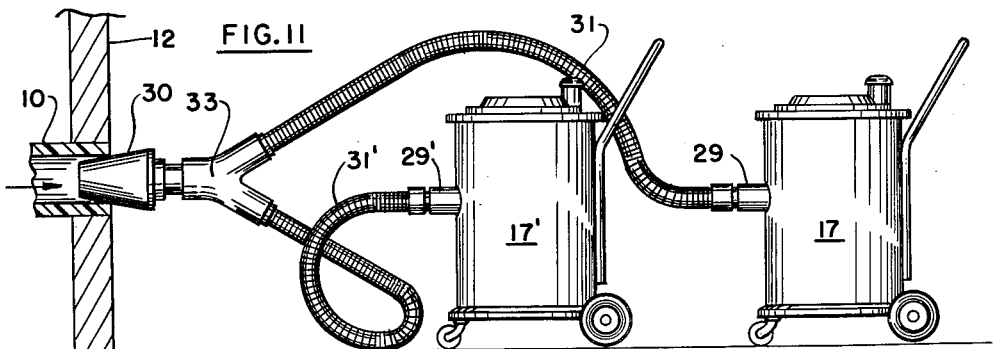
FIGURE 11 shows the dual use of a pair of portable electric vacuum cleaners in parallel for increased suction pull.

With reference to figure 11, there is illustrated two vacuum cleaners 17 and 17' connected in parallel with each other for increased air flow capacity and utilizing a Y-connection 33 between the respective hoses 31 and 31' and the single nozzle 30.

Figure 12:
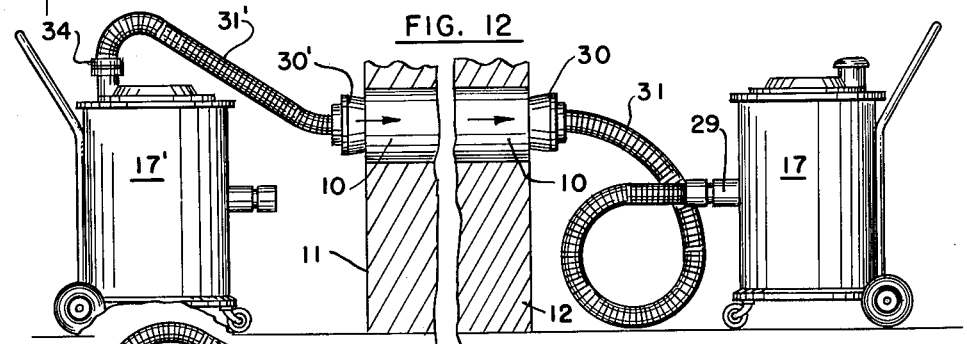
FIGURE 12 shows the dual use of a portable electric vacuum cleaner at one end of the conduit and the conjunctive use of a second portable electric vacuum cleaner, utilized as a blower, at the opposite end of the conduit.
Figure 13:
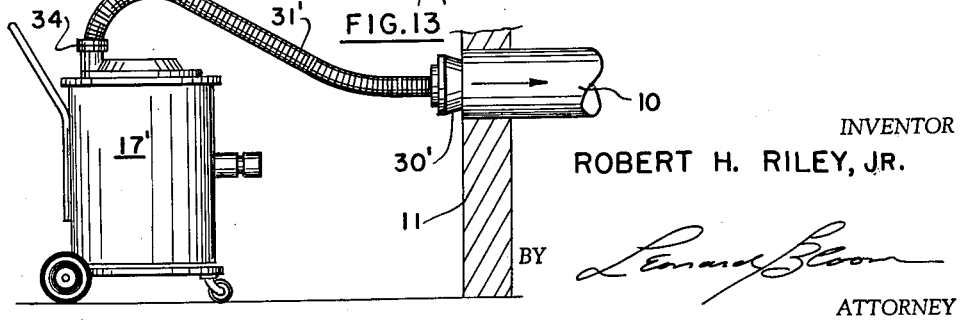
FIGURE 13 shows the use of a single portable electric vacuum cleaner, utilized as a blower having a sustained or continuous output flow of air, at one end of the conduit.

With reference to FIGURE 12, the inherent versatility of the teachings of the present invention is further illustrated, wherein a vacuum cleaner 17 is utilized as a portable source of suction, in a manner hereinbefore explained, and wherein a second vacuum cleaner 17' is utilized as a portable blower at the opposite end of the conduit 10, thereby increasing the capacity of the system and hence the speed of the carrier 18 through the conduit 10. The vacuum cleaner 17' has its normal air exit 34 connected by means of the hose 31' to its own nozzle 30'. When the vacuum cleaner 17' is thus utilized as a blower, it will be understood by those skilled in the art that the line (which is attached to the carrier) will be pinched slightly between the second nozzle means 30' and the conduit 10. Moreover, if desired, the portable electric vacuum cleaner 17' may be utilized separately as a blower having an unlimited capacity for a sustained or continuous output flow of air, as is illustrated in FIGURE 13.

With reference to FIGURE 4, there is illustrated a plurality of conduits 10, which are made from a suitable plastic, but which may be made of cast iron or any suitable material, encased in concrete 35 within a trench in the ground 36; and each of the conduits 10 is shown with its electrical cable 14 installed therein.

With reference to FIGURES 8 and 9, the conduits 10 may be formed internally by means of successive and identical longitudinal sections 37 of Transite or other suitable material. Each of the sections may have an outer annular flange 38 which seats over an inner annular flange 39 of the next section 37, and the joint between the two adjoining sections 37 may be covered over with a suitable moisture-sealing compound designated generally as at 40.

It should be understood, of course, that the teachings of the present invention are equally applicable to all types of conduits, as well as to a wide variety of lengths, sizes, and cross-sectional shapes, and only the carrier 18 need be modified to accommodate the various conduits 10. Moreover, the type of carrier 18 illustrated herein is only exemplary of a wide variety of carriers which may be utilized in the present invention.

In summary, the aforementioned features, advantages and inherent utility of the present invention are as follows:

First, the system is completely safe. Any foreign matter, such as moisture and debris, is removed and safely collected in an enclosed tank that is part of the cleaner, and hence the hazard of injury to operators or damage to buildings or equipment is removed. Moreover, the operating pressures, are relatively low so as to be non-damaging to the conduit, yet these low operating pressures are utilized along with relatively-high capacities of air flow, thereby resulting in a safe, yet practical, system. Furthermore, the carriers and the line secured thereto are effective insulators, which eliminates the safety hazard associated with the "Electric Mouse" and the line voltages utilized therein; and finally, in using the present invention, any noxious gases or fumes may be removed from the conduit during the threading operation.

Secondly, the system of the present invention is completely portable, yet it is fully capable of initially threading a conduit with a line of sufficient strength for directly pulling a cable through the conduit, thus avoiding the numerous and time-consuming "repulls" associated with the prior art pressurized methods.

Third, the system of the present invention is a low cost system, one which does not involve the continuous purchase of gas cartridges, bottle refills, line packages or disposable carriers.

Fourth, it is a universal system which is readily adaptable for various conduit sizes; consequently, the complete range of normal conduit sizes are covered with fewer components than any other commercially-available system, yet the time and equipment involved in changing from one conduit size to another is kept to a minimum.

Fifth, the present system, which utilizes the vacuum principle, has unlimited capacity for supplying a continuous or sustained flow of air; and thus it is distinguished from a blower, which has a limited capacity and which depends upon the discharge of a pressurized reservoir.

Sixth, it is able to locate and quickly identify opposite end openings in multiple duct installations by means of applying the vacuum at one end and either feeling or listening for suction at remote locations, thereby saving a considerable amount of time in installing electrical wiring.

Lastly, and in general, there is no other commercially-available system which will do the job as completely, as safely, as easily and at as low a cost as that of the present invention.

Obviously, many modifications may be made without departing from the basic spirit of the present invention, and therefore, within the scope of the appended claims the invention may be practiced other than has been specifically described.

I claim:

1. For use with a conduit having a pair of open ends, apparatus for threading a line through the conduit, comprising in combination, a portable electric vacuum cleaner of the wet pick-up type at one end of the conduit, nozzle means in relative air-sealing engagement between the said one end of the conduit and said portable electric vacuum cleaner, a carrier inserted at the other end of the conduit, and a line secured to said carrier, whereby said portable electric vacuum cleaner may be actuated to draw said carrier and said line secured thereto through said conduit, said carrier being drawn by the vacuum flush against said nozzle means, thereafter enabling said carrier and said line to be withdrawn from the conduit by removing said nozzle means from the conduit, and whereby the conduit may be cleaned of moisture and debris ahead of drawing said carrier through the conduit.

2. Apparatus as described in claim 1, wherein a plurality of portable electric vacuum cleaners in parallel with each other are provided at the said one end of the conduit.

3. Apparatus as described in claim 2, wherein a pair of portable electric vacuum cleaners of the wet pick-up type are provided, and wherein a Y-connection is provided to couple said pair in parallel, said Y-connection having a main portion and a pair of branches, said main portion of said Y-connection being coupled to said nozzle means, and said pair of branches of said Y-connection being coupled to a respective one of said pair of portable electric vacuum cleaners.

4. For use with a conduit having a pair of open ends, apparatus for threading a line through the conduit, comprising in combination, at least one portable electric vacuum cleaner of the wet pick-up type at one end of the conduit, first nozzle means in relative air-sealing engagement between the said one end of the conduit and said portable electric vacuum cleaner, a carrier inserted at the other end of said conduit, a line secured to said carrier and extending beyond the conduit, at least one portable electric vacuum cleaner utilized as a blower at the said other end of the conduit, and second nozzle means in relative air-sealing engagement between the said other end of the conduit and said portable electric vacuum cleaner which is utilized as a blower, said line being pinched slightly between said second nozzle means and said conduit, whereby said portable electric vacuum cleaners may both be actuated to propel said carrier and draw said line through said conduit.

5. Apparatus as described in claim 1, wherein said carrier comprises an arbor having a pair of threaded ends, a pair of relatively-thin pistons, and means to secure each of said pair of pistons adjacent to a respective one of said pair of threaded ends of said arbor, said means including locking nuts engaging said threaded ends of said arbor.

6. Apparatus as described in claim 5, wherein each of said pistons is laminated and has a diameter slightly larger than the internal diameter of the conduit, whereby said pistons may flex slightly in being drawn through the conduit.

7. Apparatus as described in claim 5, wherein an eyelet is formed in abutting relationship to one of said pair of ends of said arbor, whereby said line may be secured to said carrier.

8. Apparatus as described in claim 1, wherein said nozzle means comprises a frusto-conical nozzle member adapted to be inserted in the said one end of the conduit, a flexible coupling hose disposed between said nozzle member and said portable electric vacuum cleaner, and said nozzle member having an internal passageway communicating said coupling hose with the conduit.

References Cited in the file of this patent
UNITED STATES PATENTS

| | | |
|---|---|---|
| 526,141 | Bloomer | Sept. 18, 1894 |
| 1,851,435 | Jessup | Mar. 29, 1932 |
| 2,066,960 | Cook et al. | Jan. 5, 1937 |
| 2,515,953 | Dufresne | July 18, 1950 |
| 2,643,732 | Keen | June 30, 1953 |
| 2,980,399 | Littlefield | Apr. 18, 1961 |